United States Patent
Jang et al.

(10) Patent No.: US 10,104,348 B2
(45) Date of Patent: Oct. 16, 2018

(54) IMAGE MANAGEMENT SYSTEM FOR IMPROVING RENDERING EFFICIENCY IN REAL-TIME AND METHOD THEREOF

(71) Applicant: CJ CGV CO., LTD., Seoul (KR)

(72) Inventors: Kyung Yoon Jang, Seoul (KR); Hyung Jin Yoon, Anyang-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 15/463,595

(22) Filed: Mar. 20, 2017

(65) Prior Publication Data

US 2018/0213192 A1    Jul. 26, 2018

(30) Foreign Application Priority Data

Jan. 26, 2017  (KR) ........................ 10-2017-0012519

(51) Int. Cl.
  *H04N 9/31*    (2006.01)
  *H04N 13/04*   (2006.01)
  *G06T 3/00*    (2006.01)
  *H04N 5/77*    (2006.01)

(52) U.S. Cl.
  CPC ........... *H04N 9/3147* (2013.01); *G06T 3/005* (2013.01); *H04N 5/77* (2013.01)

(58) Field of Classification Search
  CPC .............................. H04N 9/3147; G06T 3/005
  USPC .................. 348/744, 715, 714, 716; 725/105
  See application file for complete search history.

(56) References Cited

U.S. PATENT DOCUMENTS

| | | | |
|---|---|---|---|
| 5,461,679 A | 10/1995 | Normile et al. | |
| 6,041,143 A | 3/2000 | Chui et al. | |
| 7,148,906 B2 | 12/2006 | Sakashita et al. | |
| 2007/0226768 A1* | 9/2007 | Takada | H04N 5/76 725/105 |
| 2010/0088646 A1 | 4/2010 | Nishimori et al. | |
| 2015/0296192 A1* | 10/2015 | Maeda | H04N 9/3185 348/745 |
| 2016/0119507 A1* | 4/2016 | Duyvejonck | H04N 9/3147 348/512 |

FOREIGN PATENT DOCUMENTS

| | | |
|---|---|---|
| KR | 10-2011-0055011 A | 5/2011 |
| KR | 10-2011-0086314 A | 7/2011 |
| KR | 10-1511520 B1 | 4/2015 |
| KR | 10-2016-0013845 A | 2/2016 |

OTHER PUBLICATIONS

International Search Report for PCT/KR2017/003135 dated Oct. 23, 2017, citing the above reference(s).
Korean Official Action dated Jan. 19, 2018 in connection with the counterpart Korean Patent Application No. 10-2017-0012519, citing the above reference(s).

\* cited by examiner

*Primary Examiner* — Brian Yenke
*Assistant Examiner* — Jean W Desir
(74) *Attorney, Agent, or Firm* — Hauptman Ham, LLP (57) ABSTRACT

The present invention relates to a system and method for regenerating image contents in a theater, and more specifically, to an image management system and method for regenerating image contents in a theater, which can decode high-resolution image contents and store the decoded image contents in a shared storage unit so that a plurality of slave devices may read image data from the shared storage unit and perform data processing or image processing on needed portions.

8 Claims, 4 Drawing Sheets

FIG.1

(Related Art)

IMAGE MANAGEMENT SYSTEM FOR IMPROVING RENDERING EFFICIENCY IN REAL-TIME AND METHOD THEREOF

CROSS REFERENCE TO RELATED APPLICATION

The present application claims the benefit of Korean Patent Application No. 10-2017-0012519 filed in the Korean Intellectual Property Office on Jan. 26, 2017, the entire contents of which are incorporated herein by reference.

TECHNICAL FIELD

The present invention relates to a system and method for regenerating image contents in a theater, and more specifically, to an image management system and method for regenerating image contents in a theater, which can decode high-resolution image contents and store the decoded image contents in a shared storage unit so that a plurality of slave devices may read image data from the shared storage unit and perform data processing or image processing on needed portions.

BACKGROUND ART

Conventionally, contents images are provided in a method described below in a so-called multi-surface theater which provides a motion picture projection service by utilizing a screen and other projection surfaces.

That is, an original copy of a contents image is divided on the basis of correction information of each projector installed in the theater, and each of the contents images divided like this is corrected and rendered to be created as an image optimized to each projector. Such a method has an advantage of enhancing efficiency of regeneration since the image is created in a state optimized to the projector.

However, the contents image method as described above also has problems, such as a problem of consuming too much time in rendering an image for each theater since the original image should be re-rendered according to correction information of each projector and a problem of re-rendering the entire original image when the correction information of the projector is changed by air-conditioning, vibration or the like in the theater.

Meanwhile, to complement the disadvantages of the contents image providing method described above, a method of correcting and rendering an original image in real-time is spotlighted recently. Since the new contents image providing method may correct and regenerate an original image in real-time, it has an advantage of high efficiency in distributing and managing a contents image.

However, such a new method also has a problem, and it is inappropriate to using high-resolution contents due to the nature of a method of decoding and correcting an original image in real-time.

DISCLOSURE OF INVENTION

Technical Problem

An object of the present invention is to provide an environment for correcting and regenerating an original image in real-time when a contents image is provided in a multi-surface theater.

Particularly, the object of the present invention is to provide an environment in which a high-resolution contents image may also be corrected and rendered in real-time.

Technical Solution

An image management system according to the present invention includes: a master device for controlling a plurality of slave devices; the plurality of slave devices for loading an image data from a shared storage unit and processing the image data under the control of the master device; and the shared storage unit for storing the image data to be processed by the plurality of slave devices.

The image data includes a control data and a plurality of image frames.

The plurality of slave devices includes a rendering unit, and the rendering unit of each slave device processes the image data received from the shared storage unit.

The image data that the rendering unit of each slave device receives from the shared storage unit includes the same image frame.

A specific slave device among the plurality of slave devices further includes a decoding unit, and the master device decodes a contents image by controlling the specific slave device.

Here, that the master device decodes a contents image by controlling the specific slave device means that the master device controls the specific slave device to decode the contents image.

The shared storage unit is provided in the master device or any one of the slave devices.

The shared storage unit is an independent server device connected to the master device or the slave devices through a network.

Meanwhile, in an image management method by a master device and a plurality of slave devices, the image management method according to the present invention includes the steps of: (a) decoding a contents image and storing an image data of the decoded contents image into a shared storage unit, by the master device or a specific slave device among the plurality of slave devices; and (b) loading the image data stored in the shared storage unit and processing the loaded image data, by the plurality of slave devices.

The image data includes a control data and a plurality of image frames.

At step (a), the master device decodes the contents image by controlling any one slave device among the plurality of slave devices.

At step (b), the master device loads only some of the image data needed for data processing among the image data stored in the shared storage unit by controlling the plurality of slave devices.

Advantageous Effects

According to the present invention, there is an effect of correcting a contents image to be projected on a projection surface in real-time although the structure of a theater is changed or the position of a projector is changed due to projection of the contents image.

Particularly, according to the present invention, since data processing can be performed on a high-resolution contents image of 4K or higher in a speedy way, there is an effect of easily correcting and rendering the high-resolution contents image in real-time.

In addition, according to the present invention, resources can be saved since the number of decoding the contents image is reduced compared with a conventional method, and furthermore, there is also an effect of saving cost since operations performed by equipment and software for decoding the contents image can be minimized.

BEST MODE FOR CARRYING OUT THE INVENTION

Details of the objects and technical configuration of the present invention and operational effects according thereto will be clearly understood hereinafter by the detailed description based on the accompanying drawings attached in the specification of the present invention. Embodiments according to the present invention will be described in detail with reference to accompanying drawings.

In the following description, functional blocks shown in the figures and described below are merely examples of possible implementations. Accordingly, other functional blocks may be used in other implementations without departing from the spirit and scope of the detailed description. In addition, although one or more functional blocks of the present invention are expressed as individual blocks, one or more of the functional blocks of the present invention may be a combination of various hardware and software executing the same function.

In addition, the expression of 'including' an element is an expression of an 'open type' which merely refers to existence of a corresponding component, and it should not be construed as precluding additional components.

Furthermore, it should be construed that when an element is referred to as being connected or coupled to another element, it may be directly connected or coupled to the other element or intervening elements may be present.

In addition, it should be understood that the image management system described below may be implemented through connection operation of various hardware and software. For example, the image management system may be implemented through connection operation of a plurality of projectors and a projection management device (server) wiredly or wirelessly connected to the projectors, and the image management system may be implemented through connection operation of various hardware and software in addition to such a connection.

Figure 1:
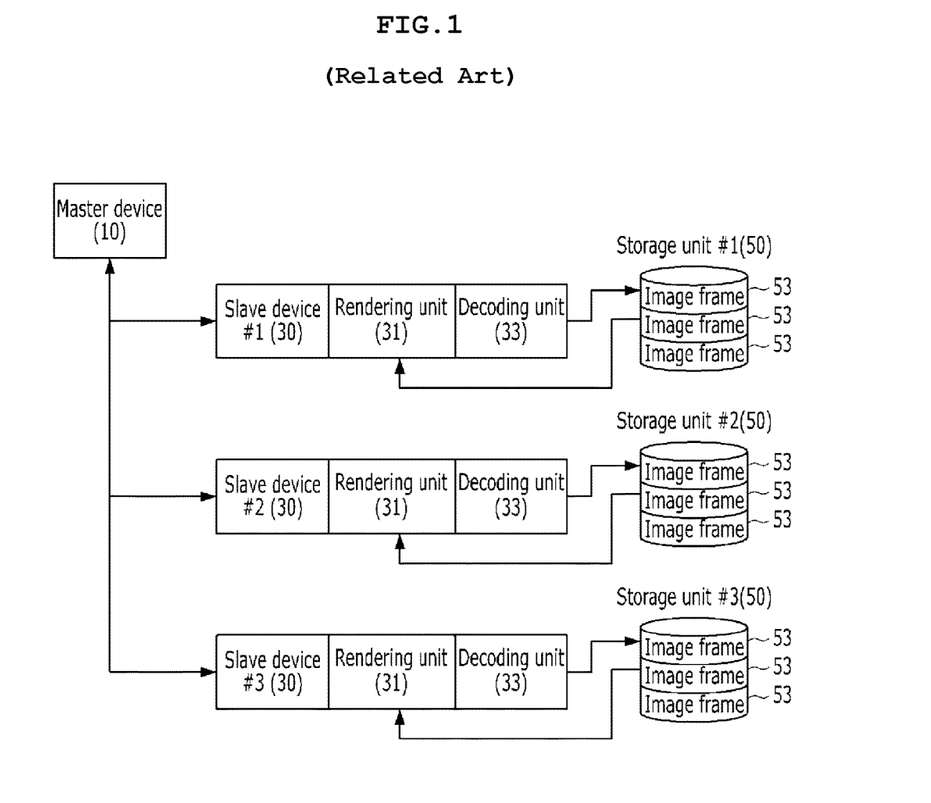
FIG. 1 is a view showing the configuration of a conventional image management system.

FIG. 1 is a view schematically showing an image management system according to a conventional method.

According to FIG. 1, a conventional image management system includes a master device 10, a plurality of slave devices 30, and a plurality of storage units 50 respectively connected to the slave devices 20. The master device 10 controls the plurality of slave devices 30, and each of the slave devices 30 includes a rendering unit 31 and a decoding unit 33 to perform a function of processing image data, and the image data is stored in each of the storage units 50.

According to the image management method by a conventional method, one slave device is connected to one projector. That is, one slave device performs image decoding to regenerate an image to be projected by one projector.

As a result, operation of the slave devices respectively connected to the projectors projecting the same image will be increased due to decoding of the same image, and there is a difficulty in regenerating a high-resolution image.

A slave device according to the present invention, which will be described below, decodes the entire content image to regenerate an image to be projected by one or more of projectors and stores the decoded content image in a storage unit. For example, one slave device may be connected to three projectors. For further detailed example, slave 1 and 2 may be connected to projectors installed on the left side wall to regenerate an image projected on the right side wall, and slave 3 and 4 may be connected to projectors installed on the right side wall to regenerate an image projected on the left side wall. At this point, slave 1 and 2 share any one shared storage unit in which image data to be projected on the right side wall are stored. Slave 3 and 4 share another shared storage units in which image data to be projected on the left side wall are stored.

That is, slave devices connected to projectors regenerating the same image share a shared storage unit. Here, the same image means the physically same images. Alternatively, the same image means divided images when one image is divided into several areas.

As a result, since a slave device may be connected to one or more projectors in the present invention, operation on an image is reduced from the aspect that the image does not need to be decoded as many times as the number of the projectors.

Seeing FIG. 1, each of the slave devices 30 includes the decoding unit 33, and in the conventional method, the decoding unit should be included as an essential component since each slave device 30 should individually decode a contents image.

In addition, in the conventional image management system, a storage unit 50 is connected to each slave device 30, and the storage unit should also be included as an essential component since a space for storing contents images decoded by the slave device 30, i.e., image data, is needed.

The conventional image management system has a problem of inefficiency in that each slave device 30 individually performs decoding or separately stores substantially the same image data in the storage unit 50 when a projection environment by a plurality of projectors is to be implemented. Furthermore, in the days in which high-resolution contents images gradually increase, the conventional image management system is difficult to be commercialized since too much processing time and resources are consumed to process the high-resolution contents images.

Figure 2:
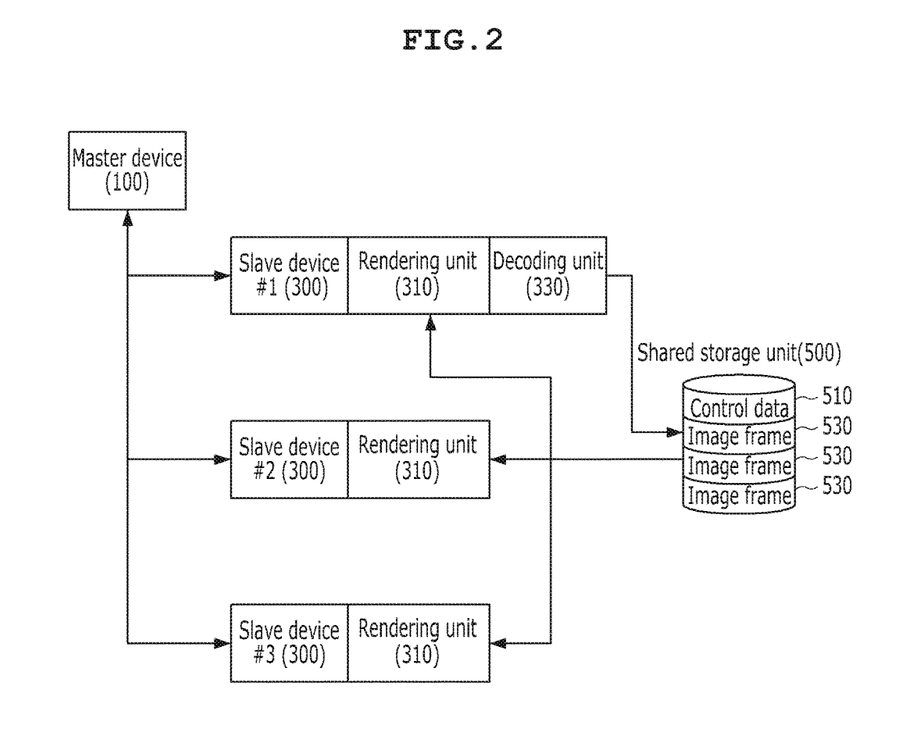
FIG. 2 is a view showing a schematic configuration of an image management system according to the present invention.

FIG. 2 is a view showing a schematic configuration of an image management system according to the present invention.

According to FIG. 2, an image management system according to the present invention includes a master device 100, a plurality of slave devices 300 and a shared storage unit 500 as configurations. Compared with FIG. 1, there is a difference in that the image management system according to the present invention is provided with one shared storage unit 500 instead of a plurality of storage units, and the detailed configuration of the slave device 300 is different as will be described below. Hereinafter, each of the configurations will be described.

First, the master device 100 is a server device provided in a theater, and the master device 100 receives a contents image or an advertisement image input from the outside and performs a function of controlling a plurality of slave devices 300 so that the input image may be projected by individual projectors. In addition, the master device 100 may monitor operation states of the plurality of slave devices 300 and operation states of the projectors.

Meanwhile, at this point, the theater mentioned in the present invention is generally a space for projecting movie contents, which is assumed to include a plurality of projection surfaces, and at this point, one or more screens and walls may be included in the plurality of projection surfaces. In addition, it is assumed that the theater in the present invention is a so-called multi-surface theater which can provide audience with a sense of immersion by allowing the plurality of projectors to project synchronized contents images on the plurality of projection surfaces.

The slave devices 300 are driven under the control of the master device 100, and the slave devices 300 process image data of a contents image to be projected by a corresponding projector in association with one or more projectors. For example, if a first projector corresponds to a main screen on the front side of the theater and a second projector and a third projector respectively correspond to the left and right side walls of the theater, there are three slave devices 300 respectively processing image data of the contents image to be projected by the first to third projectors. For another example, a first projector and a second projector may correspond to the main screen on the front side of the theater, a third projector and a fourth projector may correspond to the projection surface on the left side wall of the theater, and a fifth projector and a sixth projector may correspond to the projection surface on the right side wall of the theater. There are a first slave device associated with the first projector and the second projector, a second slave device associated with the third projector and the fourth projector and a third slave device associated with the fifth projector and the sixth projector to process image data of the contents image to be projected by the first to sixth projectors.

If each of the projectors associated with any one of the slave devices 300 divides an image and projects a divided image on one of the projection surfaces, any one of the slave devices 300 described above may read information on the divided images projected by each of the projectors from the shared storage unit 500.

Although the slave devices 300 correspond to different projection surfaces in the embodiment described above, the present invention is not limited thereto, and a plurality of slave devices 300 may correspond to the same projection surface. For example, one or more projectors associated with any one of the slave devices 300 may correspond to the left side of a first projection surface, and one or more projectors associated with another slave device 300 may correspond to the right side of the first projection surface.

The slave devices 300 may be installed in a certain space of the theater, and for example, they may be installed together at a place where a projector is installed, or the slave devices 300 may be installed together in a space where the master device 100 is installed.

The slave device 300 may include a rendering unit 310 and a decoding unit 330 as detailed configurations.

The rendering unit 310 refers to a functional unit for processing image data of a broad sense after reading the image data, and at this point, the processing type of the image data may include adjustment of a projection position, adjustment of brightness/color of an image, texture mapping and the like. The rendering unit 310 creates a two-dimensional final image through image data processing, and at this point, the final image is projected in the future by a projector connected to a corresponding slave device 300.

The decoding unit 330 is a functional unit for decoding an original contents image and performs a function of converting the original image so that the slave device 300 may perform data processing. The decoding unit 330 internally includes a buffering unit needed for decoding. Meanwhile, the original image converted by the decoding unit 330 is stored in the shared storage unit 500 which will be described below in the form of an 'image data'.

Before the decoding device 330 included in any one of the slave devices 300 existing in the theater decodes the original image, the master device 100 may decrypt an encrypted image. The master device 100 stores the decrypted image in the shared storage unit 500. Another slave device regenerating an image the same as an image regenerated by any one of the slave devices 300 through a projector may read the decrypted image stored in the shared storage unit 500 without the need of decryption.

Before the decoding device 330 included in any one of the slave devices 300 existing in the theater decodes the original image, the slave device 300 may decrypt an encrypted image. Any one of the slave devices 300 described above stores the decrypted image in the shared storage unit 500. Another slave device regenerating an image the same as an image regenerated by any one of the slave devices 300 described above through a projector may read the decrypted image stored in the shared storage unit 500 without the need of decryption.

On the other hand, although it is described above that a plurality of slave devices 330 may be provided in a theater as a special case related to the decoding unit 330, in the case of the image management system according to the present invention, only any one of the slave devices 300 is provided with the decoding unit 330, and the other slave devices 300 may not be provided with the decoding unit 330. That is, since the image management system according to the present invention is implemented to share image data while storing the image data in the shared storage unit 500, each of the slave devices 300 does not need to individually decode the contents image. Accordingly, the image management system according to the present invention may be implemented to decode one contents image only once by providing the decoding unit 330 only in any one slave device 300 among the plurality of slave devices 300.

Meanwhile, although an embodiment of a case in which a decoding unit 330 is provided in a slave device 300 is described above, it should be understood that the decoding unit 330 may be implemented in the master device 100. That is, the master device 100 according to the present invention may include a decoding unit 330 provided with hardware and software capable of decoding a moving image internally and may convert an original image of contents received from the outside in a form on which data processing can be performed and store the converted image in the shared storage unit 500.

On the other hand, the decoding unit 330 may be implemented as an independent server device, not the master device or the slave device 300. That is, the decoding unit 330 may be implemented as a separate server device and may receive an original copy of the contents image from the master device 100 connected through a network, convert the original copy into a form on which data processing can be performed and store the converted image in the shared storage unit 500.

The shared storage unit 500 is a configuration for performing a function of storing data needed by the slave devices 300 and results obtained from the operation of the slave devices 300, and particularly, the shared storage unit 500 according to the present invention may be accessed by a plurality of slave devices 300.

That is, the shared storage unit 500 is a space for storing image data after the contents image is decoded, which is a core component capable of saving resources and data processing time compared with a conventional system by allowing a plurality of slave devices 300 to share the image data.

In addition, the shared storage unit 500 is a space for storing decrypted image data before decoding the image data.

Meanwhile, the image data stored in the shared storage unit 500 may be classified into a control data 510 and an image frame 530. The control data 510 includes information needed to control the image data currently stored in the shared storage unit 500, which stores information that can be utilized by each of the slave devices 300 to process the image data, such as an identification number of each image frame 530, an address at which the image frame 530 is stored, the size of an image frame 530, a time stamp and the like. The image frame 530 means individual data of the original contents image in a state of being divided into frames.

Meanwhile, the shared storage unit 500 may be installed in a certain space of a theater as an independent device and may transmit and receive data to and from the slave devices 300 using a wireless of wired network.

In addition, the shared storage unit 500 may be provided inside the master device 100 or a slave device 300 while sharing a housing with the devices. For example, the shared storage unit 500 may be provided in the form of a hard disk or flash memory inside the master device 100 or the slave device 300.

Alternatively, the shared storage unit 500 is a configuration existing outside the theater and may be implemented in the form of, for example, a cloud server.

As is described above, the shared storage unit 500 is not limited by the location of installation and is connected to the slave devices 300 through a network to share the image data stored therein.

The major components of the image management system according to the present invention have been described with reference to FIG. 2.

Hereinafter, an image management method will be described with reference to FIG. 3.

Figure 3:
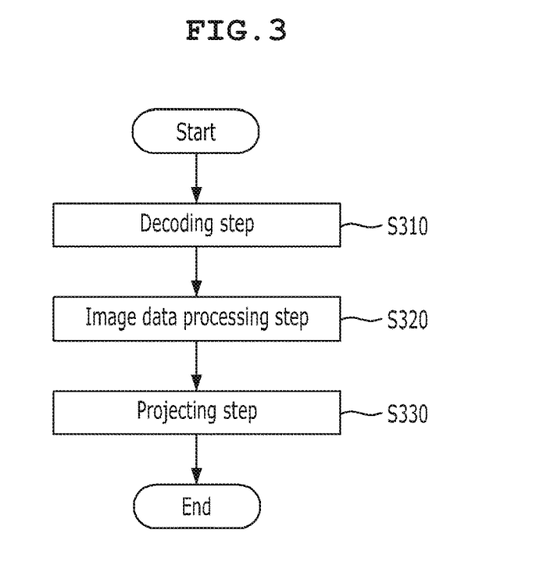
FIG. 3 is a flowchart sequentially illustrating an image management method according to an embodiment of the present invention.

According to FIG. 3, the image management method according to the present invention largely includes i) a decoding step of decoding a contents image and storing image data in the shared storage unit 500 (step S310), and ii) an image data processing step of reading an image data from the shared storage unit 500 and processing the image data (step S320). Meanwhile, after the image data processing step, the image management method may continue to the step of projecting a newly rendered image, i.e., a corrected image, through projectors matching to each slave device 300 (step S330).

Although it is omitted in FIG. 3, the image management method according to the present invention may further include a decryption step before the decoding step (step S310).

Since the present invention deals with only the decoding step and the image data processing step, detailed description of a projection step will be omitted.

First, the decryption step is described. This is a step of decrypting an encrypted image data before decoding the image data, in which the encrypted image data passes through a decryption process using an algorithm used when the image data is encrypted. The image data passing through the decryption step is stored in the shared storage unit 500, and the image data is used in the decoding step described below.

First, the decoding step is described.

As described above, the decoding step is a step of converting an original copy of a contents image so that data processing may be performed thereon, and after the decoding is completed, the image data is stored in the shared storage unit 500.

A subject which performs decoding on the contents image is preferably a slave device 300. As a special case of the decoding step, the decoding step is performed by any one specific slave device 300 among the plurality of slave devices 300, and at this point, the specific slave device 300 includes the decoding unit 330.

That is, unlike the conventional image management system in which all the slave devices 300 individually perform decoding, resources may be saved in the image management system of the present invention since the decoding is performed only in one slave device 300.

Specifically, the specific slave device 300 according to the present invention decodes an original contents image under the control of the master device 100 and stores the contents image, i.e., the image data, in the shared storage unit 500 after the decoding step.

Figure 4A:
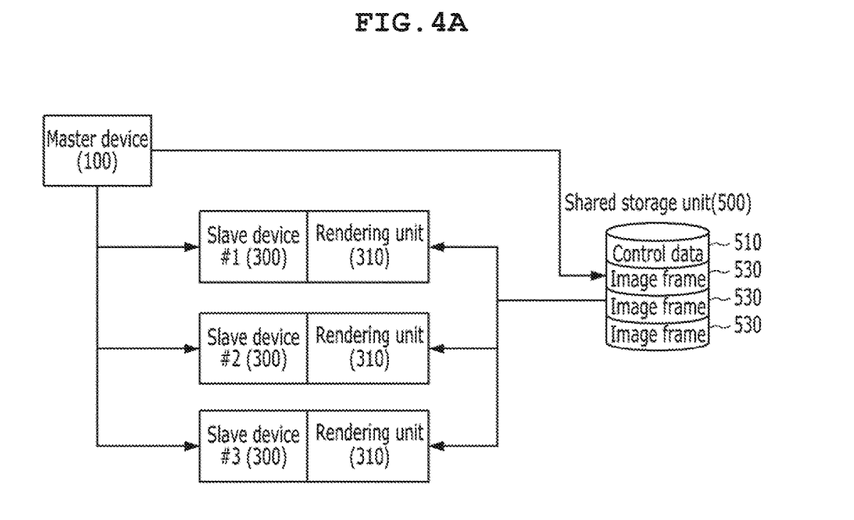
FIG. 4A is a view schematically showing an image management system according to another embodiment of the present invention, which is a case of directly connecting a master device and a shared storage unit.

Meanwhile, the decoding step may be performed by the master device 100 as a subject. That is, the master device 100 does not decode a contents image by controlling the specific slave device 300, and the master device 100 itself may decode an original copy of a contents image and store the decoded contents image in the shared storage unit 500. In this case, it is assumed that the master device 100 is provided with hardware and software for decoding the image. In addition, in this case, the overall image management system will be implemented in a state of connecting the master 100 to the shared storage unit 500 as shown in FIG. 4A, and the slave devices 300 are provided with only the rendering unit 310 without the need of providing a separate decoding unit 330.

Figure 4B:
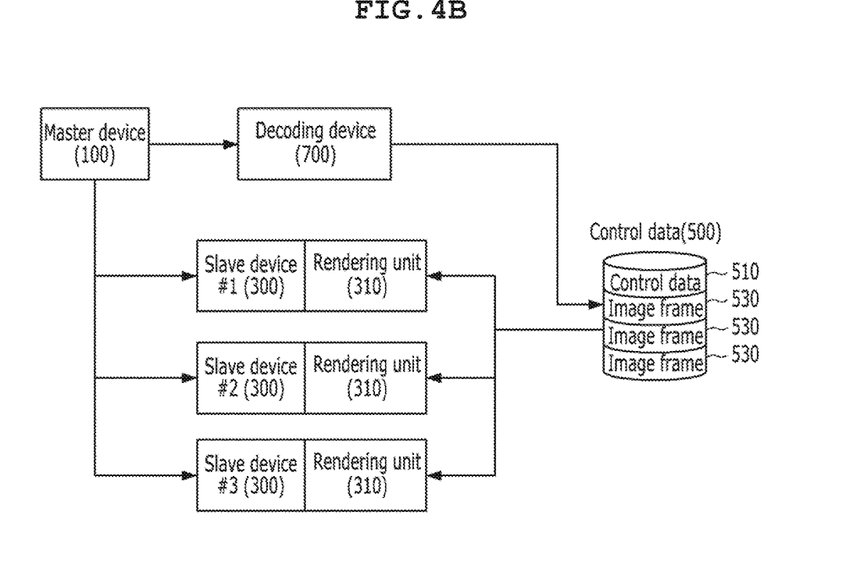
FIG. 4B is a view schematically showing an image management system according to still another embodiment of the present invention, which is a case of connecting a decoding device between a master device and a shared storage unit.

On the other hand, the decoding step may be performed by an independent decoding device 700 as a subject. That is, the decoding device 700 may be included in the image management system as a separate server device, and the decoding device 700 may exist in a state of being connected to the master device 100 and the shared storage unit 500 as shown in FIG. 4B. In this case, the decoding device 700 receives an original copy of a contents image from the master device 100 and stores the contents image in the shared storage unit after decoding the original copy.

Next, the image data processing step is described.

The image data processing step is performed by a slave device 300, and each of the slave devices 300 processes a corresponding image data after reading the image data stored in the shared storage unit 500. At this point, the meaning of processing an image data includes correcting an image itself, such as the width, height, brightness, color or the like of the image, by adjusting parameters of a corresponding image data and, furthermore, even includes correcting a position of a projection area on which a corresponding image will be projected by a projector.

Each of the slave devices 300 may be matched to projectors in the theater, and information on the projection areas of the projectors may be stored in the slave device 300, and at the image data processing step, the slave device 300 processes the image data by utilizing information on the stored projection areas. At this point, information on the stored projection area may include information such as the position of a projection area on a projection surface, a distance between a projector and the projection surface, a width and a height of a projection area projected by the projector, a material, a color, reflectivity and brightness of the projection surface, a structure installed on the project surface, and a projection obstruction area according thereto.

As an embodiment of the image data processing step, if a certain slave device 300 is matched to a projector projecting on a 'wall', the slave device 300 may adjust brightness and color of an image to be projected on the wall after reading image data from the shared storage unit 500 and, in addition, may change the color or the shape of a corresponding image portion with reference to the projection obstruction area created by a speaker installed on the wall or a pillar.

The projection obstruction area is not limited to a speaker or a pillar and includes a 'slanted surface' which is a boundary portion between the front screen of the theater and a side wall. The slanted surface means a sloped plane or an inclined plane.

In addition, as another embodiment of the image data processing step, the slave device 300 may change brightness, color or the like of an edge blending area after reading image data from the shared storage unit 500. The edge blending area, which is an overlapped area, is created as the images projected by a plurality of projectors overlap with adjacent areas by a predetermined extent. Each of the projectors decreases brightness of an image projected in the edge blending area. As each of the projectors decreases brightness of an image projected in the edge blending area, brightness of the edge blending area may become equal to the brightness of an area where images are not overlapped.

Meanwhile, the image data processing step may be simultaneously progressed by a plurality of slave devices 300, and since the projectors matching to the slave devices 300 project synchronized images on a plurality of projection surfaces, each of the slave devices 300 also reads image data of the same image frame 530 from the shared storage unit 500. That is, each of the slave devices 300 reads image data of the same image frame 530 and individually progresses image data processing taking into account the operating status of a projector matched to the slave device 300.

Figure 5:
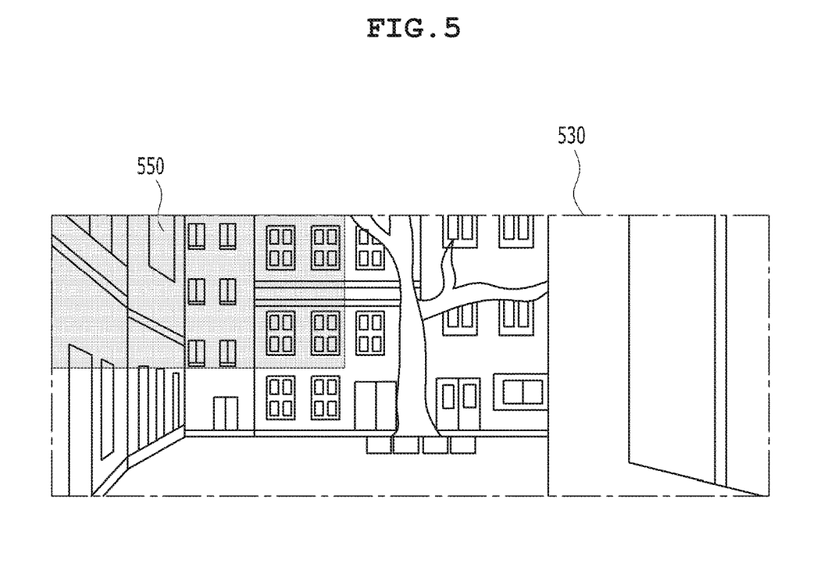
FIG. 5 is a view showing a process of loading only needed areas among image frames and performing data processing according to an embodiment of the present invention.

Meanwhile, in the image data processing step, the slave devices 300 may perform data processing after reading only a portion 550 of the image frame 530 from the shared storage unit 500. FIG. 5 shows such an embodiment, and for example, when a certain specific projector projects an image on a portion of a wall, a slave device 300 matching to the projector reads an image frame 530 stored in the shared storage unit 500, and particularly, it may specifically read only a portion 550 of an image that will be actually projected as shown in FIG. 5. If a slave device 300 is connected to a plurality of projectors, the slave device 300 specifically reads only an area on which images are projected by the plurality of projectors from the shared storage unit 500.

Figure 6:
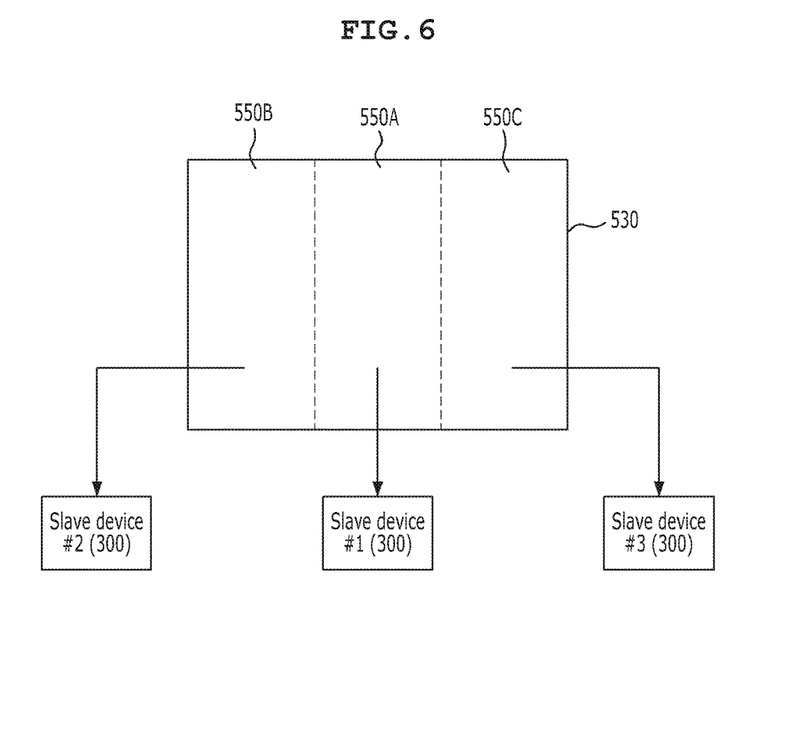
FIG. 6 is a view showing areas partitioned in an image frame and processed by each of slave devices.

If the slave device is capable of reading only a portion of the image frame 530 and perform data processing thereon, the plurality of slave devices 300 does not necessarily need to read all the image frames 530 in processing the image data and needs to perform data processing only partially as shown in FIG. 6, and as a result, it has an effect of processing the entire image data by a plurality of slave devices 300 by dividing the data.

Although the present invention has been disclosed as described above, those skilled in the art may recognize that the present invention may be embodied in a different form while maintaining the spirit and essential features of the present invention.

Accordingly, the embodiments described above are merely illustrative and not intended to restrict the scope of the present invention only to the aforementioned embodiments. Furthermore, the flowcharts shown in the figures are merely a sequence of illustrative purposes to obtain a most preferably result in embodying the present invention, and it is apparent that other steps may be further included or some steps may be deleted.

Although the scope of the present invention will be defined by the claims, configurations directly derived from the disclosure of the claims, as well as all the changed or modified forms derived from the configurations and equivalents thereof, should be interpreted as being included in the scope of the present invention.

| DESCRIPTION OF SYMBOLS | |
| --- | --- |
| 10, 100: Master device | |
| 30, 300: Slave device | |
| 31, 310: Rendering unit | |
| 33, 330: Decoding unit | |
| 50: Storage unit | 53: Image frame |
| 500: Shared storage unit | 510: Control data |
| 530: Image frame | 550: Portion of image frame |
| 700: Decoding device | |

The invention claimed is:

1. An image management system comprising:
a shared storage unit configured to store an image data;
a plurality of slave devices configured to load the stored image data from the shared storage unit and process the loaded image data; and
a master device configured to control the plurality of slave devices,
wherein only one device, among the master device and the plurality of slave devices, includes a decoding unit so that the only one device decodes a contents image of 4K or higher resolution, and
wherein the only one device decrypts an encrypted contents image before decoding the contents image and stores the decrypted contents image in the shared storage unit so that one of the slave devices regenerating a contents image the same as a contents image regenerated by any one of other slave devices reads the decrypted image stored in the shared storage unit without decryption.

2. The image management system according to claim 1, wherein the image data includes a control data and a plurality of image frames.

3. The image management system according to claim 1, wherein
each slave device of the plurality of slave devices includes a rendering unit and
the rendering unit of the each slave device is configured to process the loaded image data.

4. The image management system according to claim 1, wherein
each image data loaded on the plurality of slave devices includes a same image frame.

5. An image management method by a master device and a plurality of slave devices, the method comprising the steps of:
decrypting an encrypted contents image and storing the decrypted contents image in a shared storage unit, by the master device or a slave device among the plurality of slave devices;
decoding the contents image and storing an image data of the decoded contents image into the shared storage unit, by the master device or the slave device among the plurality of slave devices; and
loading the image data stored in the shared storage unit and processing the loaded image data, by the plurality of slave devices,
wherein only one device, among the master device and the plurality of slave devices, includes a decoding unit so that, at the decoding of the contents image, the master device decodes the contents image of 4K or higher resolution by controlling the only one device, and
wherein one of the slave devices regenerating a contents image the same as a contents image regenerated by any one of other slave devices reads the decrypted image stored in the shared storage unit without decryption.

6. The method according to claim 5, wherein at the loading of the image data, only some of the image data needed for data processing is loaded among the image data stored in the shared storage unit.

7. The method according to claim 5, wherein the image data includes a control data and a plurality of image frames.

8. The method according to claim 5, wherein at the loading of the image data, the master device loads only some of the image data needed for data processing among the image data stored in the shared storage unit by controlling the plurality of slave devices.

* * * * *